United States Patent [19]

Vanstaen

[11] Patent Number: 4,812,043
[45] Date of Patent: Mar. 14, 1989

[54] METHOD FOR MEASURING A PHYSICAL QUANTITY PROVIDING DIGITAL DATA USING ANALOG-VALUE MEASURING DEVICES, AND MEASURING APPARATUS FOR APPLYING THIS METHOD

[75] Inventor: Roland Vanstaen, Kortrijk, Belgium

[73] Assignee: Barco Automation N.V., Poperinge, Belgium

[21] Appl. No.: 945,589

[22] Filed: Dec. 23, 1986

[30] Foreign Application Priority Data

Dec. 24, 1985 [EP] European Pat. Off. ........ 85202134.4

[51] Int. Cl.⁴ .............................................. G01B 11/04
[52] U.S. Cl. .................... 356/385; 356/238; 356/429
[58] Field of Search ............. 356/384, 385, 429, 238; 250/560; 350/389, 385, 430

[56] References Cited

U.S. PATENT DOCUMENTS

| | | | |
|---|---|---|---|
| 2,510,347 | 6/1950 | Perkins | 356/385 |
| 2,641,960 | 6/1953 | Strother | 356/385 |
| 2,699,701 | 1/1955 | Strother et al. | 356/385 |
| 3,582,661 | 6/1971 | Pijls | 356/429 |
| 3,586,445 | 6/1971 | Martin, Jr. | 356/429 |
| 4,247,764 | 1/1981 | Kissinger | 250/205 |
| 4,498,781 | 2/1985 | Kaplit | 356/435 |
| 4,513,439 | 4/1985 | Gorgone et al. | 356/71 |

FOREIGN PATENT DOCUMENTS

0101049 2/1984 European Pat. Off. .
2231776 1/1974 Fed. Rep. of Germany .

*Primary Examiner*—Richard A. Rosenberger
*Attorney, Agent, or Firm*—Foley & Lardner, Schwartz, Jeffery, Schwaab, Mack, Blumenthal & Evans

[57] ABSTRACT

A measuring method and apparatus wherein the value of a physical quantity is measured by means of a first measuring device (2, 3) producing at its output an electrical voltage or current, which is a function of the value of the said physical quantity; wherein, simultaneously, a reference value for this physical quantity is measured by means of a second measuring device (2, 4), which is identical to the said first measuring device; wherein the output voltage or current of the said first measuring device (3) is applied to one of the measuring inputs (10, 11) of an analog/digital converter (9) with a variable threshold value; wherein the output voltage or current of the said second measuring device (4) is applied to the other measuring input (11, 10) of this analog/digital converter (9) and wherein the digital output signal of the said analog/digital converter (9) is applied to a processing and/or data display device (14).

6 Claims, 1 Drawing Sheet

METHOD FOR MEASURING A PHYSICAL QUANTITY PROVIDING DIGITAL DATA USING ANALOG-VALUE MEASURING DEVICES, AND MEASURING APPARATUS FOR APPLYING THIS METHOD

BACKGROUND OF THE INVENTION

The present invention relates principally to a method for measuring a physical quantity providing digital data using analog-value measuring devices, the analog response signal of which is influenced by parameters such as the ambient temperature or pressure and/or the sensitivity of which varies over time, for example on account of the aging effects of certain of its components.

OBJECTS AND SUMMARY OF THE INVENTION

One object of the invention is to provide a method whereby an always correct absolute value of the physical quantity measured can be obtained, despite the above-mentioned drawbacks of the measuring devices. Another object is to provide a measuring apparatus for applying this method, which is of very low-cost and of small dimensions and which can be used in particular to measure the width or thickness of a moving yarn or strip by optical means.

In the measuring method according to the invention, the value of a physical quantity is measured by means of a first measuring device producing at its output an electrical voltage or a current, which is a function of the value of the said physical quantity. Simultaneously, a reference value for this physical quantity is measured by means of a second measuring device with a structure identical to that of the first measuring device. The output voltage or current of the first measuring device is applied to one of the measuring inputs of an analog-digital converter with a variable threshold value. The output voltage or current of the second measuring device is applied to the other measuring input of this analog/digital converter; and the digital output signal of the analog/digital converter is applied to a processing and/or digital data display device.

According to the invention also, an apparatus for measuring in particular the width or thickness of a moving yarn or strip comprises a light source, the emitted light of which strikes, on the one hand, the yarn or strip to be measured and is detected by a first so-called measuring sensor and strikes, on the other hand, a second so-called reference sensor without encountering the yarn or strip to be measured, the second sensor having a structure identical to that of the first measuring device. The output of the first sensor is applied to one of the measuring inputs of an analog, digital converter with a variable threshold value. The output of the second sensor is applied to the other measuring input of this analog/digital converter, and the output of the analog/digital converter is applied to a processing and-/or digital data display device.

BRIEF DESCRIPTION OF THE DRAWINGS

The objects and advantages of the invention will be better appreciated by means of an example of one embodiment with reference to the attached drawing wherein.

DETAILED DESCRIPTION OF THE INVENTION

Figure 1:
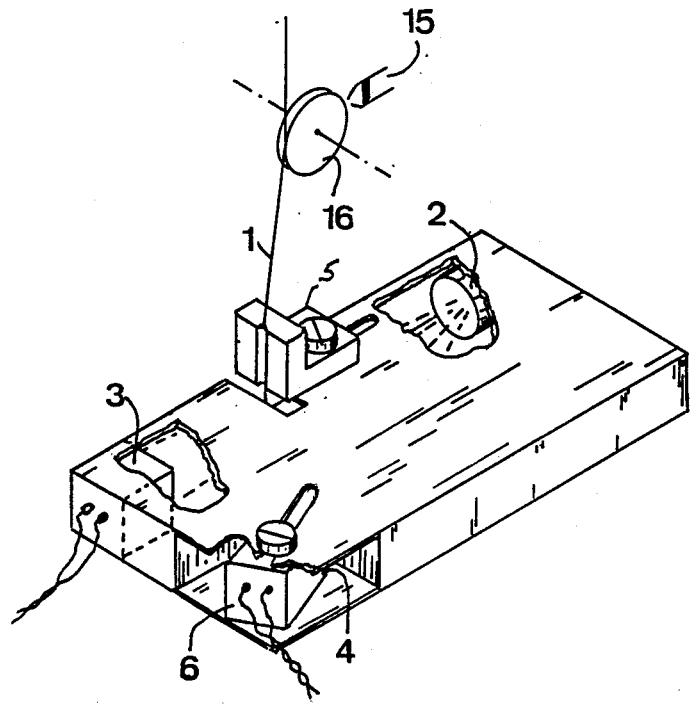
FIG. 1 is a perspective view of a measuring apparatus according to the invention.

An apparatus for measuring moving objects, in particular the thickness of a textile yarn 1, comprises a pinpoint light source 2 with a span preferably substantially smaller than the average thickness of the yarn to be measured, a first so-called "measuring" sensor 3 and a second so-called "reference" sensor 4. The yarn 1 to be measured, which is guided by a suitable device 5, passes through the light beam which strikes the measuring sensor 3. The device 5 is preferably adjustable and allows the yarn to be guided so that part of its image strikes approximately the middle of the sensor 3 and so that, on the other hand, its distance in relation to the sensor 3 may be set to a predetermined value.

Another light beam, which does not encounter the yarn 1 to be measured, strikes the reference sensor 4. this sensor 4 is mounted on an adjustable support 6. Adjustment of this support 6 allows both the sensor 4 to be displaced parallel to the beam emitted from the source 2 and its direction to be changed in relation to this beam, so that the output signal of the reference sensor 4 can be adjusted so as to be identical to the output signal of the measuring sensor 3 should there be no yarn 1 in the beam between the source 2 and the sensor 3.

It is obvious that provision may also be make for this adjustment to be performed at the sensor 3 instead of at the sensor 4.

It must be noted that, on the one hand, a commercially available pinpoint light source with a span of 0.1 mm, supplied by a constant voltage source, possesses a brightness which decreases with time and drops to 80% of its initial value at the end of 10,000 to 20,000 hours of operation. It is therefore important to eliminate this substantial variation in the light source from the measured results, by means of a reference measurement.

Figure 2:
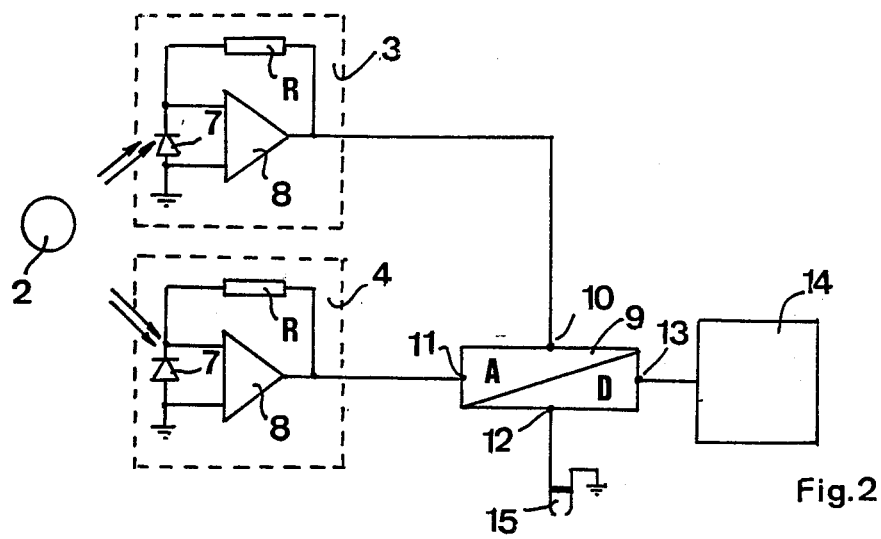
FIG. 2 is a wiring diagram of the apparatus according to the invention.

On the other hand, the brightness also varies depending on the ambient temperature. Moreover, the measuring sensors, in the case where the optoelectric diodes 7 are short-circuited as shown in the diagram in FIG. 2 and combined with an amplifier 8 arranged in parallel with a resistance R, are also subject to variations in sensitivity, in particular as a function of the temperature and also as a function of time.

By choosing identical sensors for the measure sensor 3 and the reference sensor 4, the variations in sensitivity as a function of time and of the environmental parameters are the same, so that the measure value may be corrected at all times owing to a comparison with the reference value measured simultaneously.

Usually, this comparison is effected by means of an analog comparison device, this being a very expensive method. According to the invention, this comparison is performed by an analog/digital converter 9 with a variable threshold value. This converter 9 comprises two measuring inputs 10 and 11. In this case, the output signal of the measuring sensor 3 is applied to the input 10, while the reference value appearing at the output of the sensor 4 is applied to the measuring input 11 which determines the variable threshold value. The analog/digital converter 9 comprises, in addition, an input 12 for the signal determining the sampling rate and an output 13 providing the measure digital data which represents the quotient of the measurement effected by the sensor 3 divided by the measurement effected by the sensor 4. The digital data appearing at the output 13 is introduced into a processing and/or digital data display device.

The device 14 is able to provide, in particular, a mean effected over a longer sampling time than that of the digital/analog converter 9 and the means square deviation during this longer sampling time. Display may be effected, for example, using instantaneous graphics or digitally in the case wherein the sampling time is longer. It is possible to limit the display to values falling outside a range of admissible values.

In the present example, the light source used is a "Lambert" source, ie. a pinpoint light source with a span less than 0.1 mm. This light source may be used when the average thickness of the yarn to be measured is equal to several tenths of a millimeter.

If the thickness of the yarn to be measured is too small, it is necessary to use beams with parallel light rays, whereby expensive optical systems with lenses are required.

The sensors 3 and 4 are in the form of small rectangular plates, the sides of which measure a few millimeters. These sensors are arranged in the light beams in such a way that the image of the yarn is parallel to a pair of sides. In this case, the output signal of the sensor is proportional to the area of the plate which is not illuminated owing to the shadow cast by the yarn, ie. proportional to the average thickness of the yarn portion casting the shadow. By choosing the width of the sensitive plate of the sensor 3 so that it is equal, for example, to the image of a 2.5 mm yarn and by quantifying the intensity of light received in terms of 8 bits, a digital value equal to the number of hundredths of millimeters of the yarn's thickness is obtained at the output 13 of the analog/digital converter 9 (2=256). It is always possible to obtain, at the output 13, a number equal to the thickness of the yarn, if necessary multiplied by the power of ten.

It is important to ensure that adjustment of the measuring apparatus according to the invention is preferably performed mechanically and not electrically. In fact, except in the case of measuring sensors insensitive to the ambient atmosphere parameters, it is not possible to obtain the necessary measuring reliability and precision, if the two sensors are not absolutely identical from an electrical point of view.

The signal for controlling the sampling rate may, for example, be supplied by a generator 15 which is, for example, magnetic and which is coupled to a system 16 for feeding (for example by means of a pulley) the yarn to be measured, so that the sampling effected by the analog/digital converter 9 always takes place every millimeter or every two millimeters for a predetermined length of yarn, ie. a length which is generally smaller than that projected onto the sensitive plate of the sensor 3.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An apparatus for measuring a width or thickness of moving yarn, a strip or the like comprising:
   (a) a pin-point light source having a span substantially smaller than an average width or thickness of the yarn, strip, or the like to be measured, said pin-point light source disposed to strike directly, without interposing lenses, both:
      (1) the yarn and a first sensor, the first sensor being located a predetermined distance from the yarn, strip or the like to be measured and having a sensitive plate of predetermined width, the predetermined distance and plate width being selected for obtaining a desired output measurement unit, and
      (2) a second sensor, identical to the first sensor in characteristics relating to variations in sensitivity as a function of temperature and time, the light striking the second sensor without striking the yarn;
   (b) an analog-to-digital converter having at least a pair of inputs and an output, one of the analog-to-digital converter inputs being a measuring input connected to an output of the first sensor and another analog-to-digital converter input being a reference input connected to an output of the second sensor, the output of the second sensor defining a variable threshold of the analog-to-digital converter;
   (c) an adjustable yarn-guiding device defining an exact position of the yarn, strip, or the like between the pin-point light source and the first sensor, the yarn guiding device cooperating with a signal generator producing sampling signals fed to the analog-to-digital converter so that the sampling rate of the analog-to-digital converter is determined by the speed at which the yarn, strip, or the like is fed so that sampling is effected for lengths smaller than a length projected onto the sensitive plate of the first sensor; and
   (d) the output of the analog-to-digital converter representing a thickness of the yarn, strip or the like and being applied to a process and/or display device.

2. The apparatus of claim 1 wherein the output of the analog-to-digital converter is a digitized value representing the quotient of the outputs of the first and second sensors applied to the inputs of the analog-to-digital converter.

3. A method of measuring a width or thickness of moving yarn, a strip, or the like, comprising the steps of:
   (a) directing a pin-point light source having a span substantially smaller than an average width or thickness of the yarn, strip, or the like to be measured, to strike directly, without interposing lenses, both:
      (1) the yarn and a first sensor, the first sensor being located a predetermined distance from the yarn, strip or the like to be measured and having a sensitive plate of predetermined width, the predetermined distance and plate width being selected for obtaining a desired output measurement unit, and
      (2) a second sensor, identical to the first sensor in characteristics relating to variations in sensitivity as a function of temperature and time, the light striking the second sensor without striking the yarn;

(b) applying an output of the first sensor to a first input of an analog-to-digital converter, the first input of the analog-to-digital converter being a measuring input;

(c) defining a variable threshold for the analog-to-digital converter by applying an output of the second sensor to a second input of the analog-to-digital converter, the second analog-to-digital converter input being a reference input;

(d) sampling an output of the analog-to-digital converter representing the thickness of the yarn, strip, or the like, so that sampling is effected for lengths smaller than a length projected onto the sensitive plate of the first sensor;

(e) applying the output of the analog-to-digital converter to a processing and/or display device;

(f) defining an exact position of the yarn, strip or the like with an adjustable yarn guiding device cooperating with a signal generator, the signal generator producing sampling signals fed to the analog-to-digital converter so that the sampling rate of the analog-to-digital converter is determined by the speed at which the yarn, strip, or the like is fed.

4. The method of claim 3 comprising forming the output of the analog-to-digital converter to correspond to a digitized value of a quotient of the measuring input and the reference input.

5. An apparatus for measuring a width or thickness of moving yarn, a strip or the like comprising:
  (a) a pin-point light source having a span substantially smaller than an average width or thickness of the yarn, strip, or the like to be measured, said pin-point light source disposed to strike directly, without interposing lenses, both:
    (1) the yarn and a first sensor, the first sensor being located a predetermined distance from the yarn, strip or the like to be measured and having a sensitive plate of predetermined width, and
    (2) a second sensor, identical to the first sensor in characteristics relating to variations in sensitivity as a function of time and temperature the light striking the second sensor without striking the yarn;
  (b) an analog-to-digital converter having at least a pair of inputs and an output, one of the analog-to-digital converter inputs being a measuring input connected to an output of the first sensor and another analog-to-digital converter input being a reference input connected to an output of the second sensor, the output of the second sensor defining a variable threshold of the analog-to-digital converter;
  (c) an adjustable yarn-guiding device defining an exact position of the yarn, strip, or the like between the pin-point light source and the first sensor, the yarn guiding device cooperating with a signal generator producing sampling signals fed to the analog-to-digital converter so that the sampling rate of the analog-to-digital converter is determined by the speed at which the yarn, strip, or the like is fed so that sampling is effected for lengths smaller than a length projected onto the sensitive plate of the first sensor; and
  (d) the output of the analog-to-digital converter representing a thickness of the yarn, strip or the like and being applied to a processing and/or display device.

6. A method of measuring a width or thickness of moving yarn, a strip, or the like, comprising the steps of:
  (a) directing a pin-point light source having a span substantially smaller than an average width or thickness of the yarn, strip, or the like to be measured, to strike directly, without interposing lenses, both:
    (1) the yarn and a first sensor, the first sensor being located a predetermined distance from the yarn, strip or the like to be measured and having a sensitive plate of predetermined width, and
    (2) a second sensor, identical to the first sensor in characteristics relating to variations in sensitivity as a function of temperature and time, the light striking the second sensor without striking the yarn;
  (b) applying an output of the first sensor to a first input of an analog-to-digital converter, the first input of the analog-to-digital converter being a measuring input;
  (c) defining a variable threshold for the analog-to-digital converter by applying an output of the second sensor to a second input of the analog-to-digital converter, the second analog-to-digital converter input being a reference input;
  (d) sampling an output of the analog-to-digital converter representing the thickness of the yarn, strip, or the like, so that sampling is effected for lengths smaller than a length projected onto the sensitive plate of the first sensor;
  (e) defining an exact position of the yarn, strip, or the like with an adjustable yarn guiding device cooperating with a signal generator, the signal generator producing sampling signals fed to the analog-to-digital converter so that the sampling rate of the analog to digital converter is determined by the speed at which the yarn, strip, or the like is fed;
  (f) applying the output of the analog-to-digital converter to a processing and/or display device.

* * * * *